(12) United States Patent
Curran et al.

(10) Patent No.: US 9,973,464 B2
(45) Date of Patent: May 15, 2018

(54) ADDRESSING PROPAGATION OF INACCURATE INFORMATION IN A SOCIAL NETWORKING ENVIRONMENT

(71) Applicant: INTERNATIONAL BUSINESS MACHINES CORPORATION, Armonk, NY (US)

(72) Inventors: David M. Curran, Tyrrelstown (IE); Liam Harpur, Skerries (IE); Robert E. Loredo, North Miami Beach, FL (US); Simon P. O'Doherty, Ard-Na-Griene (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 14/849,576

(22) Filed: Sep. 9, 2015

(65) Prior Publication Data
US 2017/0070471 A1 Mar. 9, 2017

(51) Int. Cl.
*H04L 12/58* (2006.01)
*H04L 29/06* (2006.01)

(52) U.S. Cl.
CPC .............. *H04L 51/32* (2013.01); *H04L 51/16* (2013.01)

(58) Field of Classification Search
None
See application file for complete search history.

(56) References Cited

U.S. PATENT DOCUMENTS

| 7,472,110 B2 | 12/2008 | Achlioptas |
| 8,825,777 B2 | 9/2014 | DeLuca et al. |

(Continued)

FOREIGN PATENT DOCUMENTS

WO 2009042947 A1 4/2009

OTHER PUBLICATIONS

Paganini, Pierluigi. PsyOps and Socialbots. General Security, Sep. 3, 2013, Infosec Institute. http://resources.infosecinstitute.com/psyops-and-socialbots/.

(Continued)

*Primary Examiner* — Natisha D Cox
(74) *Attorney, Agent, or Firm* — The Steadman Law Firm PLLC

(57) ABSTRACT

An approach is described for addressing propagation of inaccurate information in a social networking environment. An associated method may include identifying inaccurate information within the social networking environment, facilitating creation of countering content to address the inaccurate information, and disseminating the countering content. The countering content may be determined by identifying behavior of one or more users among a plurality of users within the social networking environment. Identifying the inaccurate information within the social networking environment may include receiving information provided within the social networking environment. Upon determining that the received information is factual and thus objectively verifiable, it may be determined whether the received information matches analogous information verified as accurate. Upon determining that the received information does not match the analogous information verified as accurate, the received information may be marked as inaccurate.

20 Claims, 4 Drawing Sheets

400

(56) References Cited

U.S. PATENT DOCUMENTS

| | | | |
|---|---|---|---|
| 2004/0122846 A1* | 6/2004 | Chess | G06F 17/30864 |
| 2009/0192896 A1 | 7/2009 | Newton et al. | |
| 2012/0047026 A1 | 2/2012 | Ranauro et al. | |
| 2012/0159315 A1 | 6/2012 | Chakra et al. | |
| 2013/0151240 A1* | 6/2013 | Myslinski | G06F 17/20 704/9 |
| 2013/0158984 A1* | 6/2013 | Myslinski | G06F 17/28 704/9 |
| 2014/0164994 A1* | 6/2014 | Myslinski | G06F 1/163 715/808 |
| 2015/0248482 A1* | 9/2015 | Myslinski | G06F 17/30867 707/706 |
| 2015/0293897 A1* | 10/2015 | Myslinski | G06Q 10/06 707/755 |
| 2017/0070471 A1* | 3/2017 | Curran | H04L 51/32 |

OTHER PUBLICATIONS

Kan, Zhen et al. Containment Control for a Social Network with State-Dependent Connectivity. Automatica, vol. 56, Jun. 2015, pp. 86-92. CrossMark.

Wei, Xuetao et al. Competing Memes Propagation on Networks: A Case Study of Composite Networks. ACM SIGCOMM Computer Communication Review, vol. 42 Issue 5, Oct. 2012. ACM: New York, NY.

Gao, Huiji. Modeling User Attitude toward Controversial Topics in Online Social Media, Proceedings of the Eighth International AAAI Conference on Weblogs and Social Media, Jun. 1-4, 2014, Ann Arbor, MI, pp. 121-130. AAAI Press: Palo Alto, CA.

Zhu, Lin Hong et al. Tripartite Graph Clustering for Dynamic Sentiment Analysis on Social Media. SIGMOD '14 Proceedings of the 2014 ACM SIGMOD international conference on Management of data, Jun. 22-27, 2014, Snowbird, UT, pp. 1531-1542. ACM: New York, NY.

Li, Songsong et al. Rumor Restriction in Online Social Networks. IEEE 32nd International Performance Computing and Communications Conference (IPCCC), Dec. 6-8, 2013, San Diego, CA, pp. 1-10. IEEE.

Nguyen, Nam P. et al. Containment of Misinformation Spread in Online Social Networks. WebSci '12 Proceedings of the 4th Annual ACM Web Science Conference, Jun. 22-24, 2012, Evanston, IL, pp. 213-222. ACM: New York, NY.

Introducing a new feature of IBM's Watson: The Debater. Kurzweil, May 5, 2014. http://www.kurzweilai.net/introducing-a-new-feature-of-ibms-watson-the-debater.

* cited by examiner

ADDRESSING PROPAGATION OF INACCURATE INFORMATION IN A SOCIAL NETWORKING ENVIRONMENT

BACKGROUND

The various embodiments described herein generally relate to online communication. More specifically, the various embodiments describe techniques for addressing propagation of inaccurate information in a social networking environment.

Social networking environments facilitate rapid propagation of information, often among many users. Accordingly, inaccurate information may be shared and re-shared multiple times, especially if such inaccurate information originates from a highly-rated user. Inaccurate information may be presented in a meme, which is generally defined as an idea, behavior, or style that spreads from one entity to another. Addressing such inaccurate information may be counterproductive if one or more of its propagators are attacked or censored. Attacking or censoring propagation of inaccurate information may lead to the "Streisand effect", the results of which may entail wider publication of such inaccurate information and active defense of such inaccurate information by users in a social networking environment.

SUMMARY

The various embodiments described herein provide techniques for addressing propagation of inaccurate information in a social networking environment (or other online environment). An associated method may include identifying inaccurate information of a factual nature within the social networking environment. The identification of the inaccurate information may occur via a communications network. The method further may include facilitating creation of countering content to address the inaccurate information. The countering content may be determined by identifying behavior of one or more users among a plurality of users within the social networking environment. The method further may include disseminating the countering content.

In an embodiment, the inaccurate information may be propagated by a highly-rated user among the plurality of users within the social networking environment. In a further embodiment, the method step of identifying the inaccurate information within the social networking environment may include receiving information provided within the social networking environment, and, upon determining that the received information is factual, determining whether the received information matches analogous information verified as accurate. Determining whether the received information matches the analogous information verified as accurate may include completing a comparison via at least one of natural language processing (NLP), data mining, or natural language classification. Furthermore, according to such embodiment, the method step of identifying the inaccurate information further may include, upon determining that the received information does not match the analogous information verified as accurate, marking the received information as inaccurate. Additionally, according to such embodiment, the method step of identifying the inaccurate information within the social networking environment further may include, upon determining that the received information does not match the analogous information verified as accurate, recording statistics with respect to the inaccurate information.

In a further embodiment, the countering content may include at least one aspect that resembles at least one corresponding aspect of the inaccurate information. Specifically, the countering content may be determined based upon at least one of (i) language patterns associated with the inaccurate information, (ii) content or branding within one or more images associated with the inaccurate information, or (iii) stylistic elements associated with the inaccurate information.

In a further embodiment, the method step of disseminating the countering content may include incorporating the countering content into third party material external to the social networking environment. Additionally or alternatively, the method step of disseminating the countering content may include incorporating the countering content into at least one post within the social networking environment presented in response to one or more posts including the inaccurate information. Additionally or alternatively, the method step of disseminating the countering content may include incorporating the countering content into one or more posts in an activity stream associated with the social networking environment. In such case, the one or more posts in the activity stream incorporating the countering content may have a higher priority than any post associated with the inaccurate information.

In a further embodiment, identifying the behavior of one or more users among the plurality of users within the social networking environment may include establishing a pattern of monitoring respective actions of one or more users among the plurality of users and further includes detecting any correlation between the respective actions of the one or more users and environmental stimuli.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
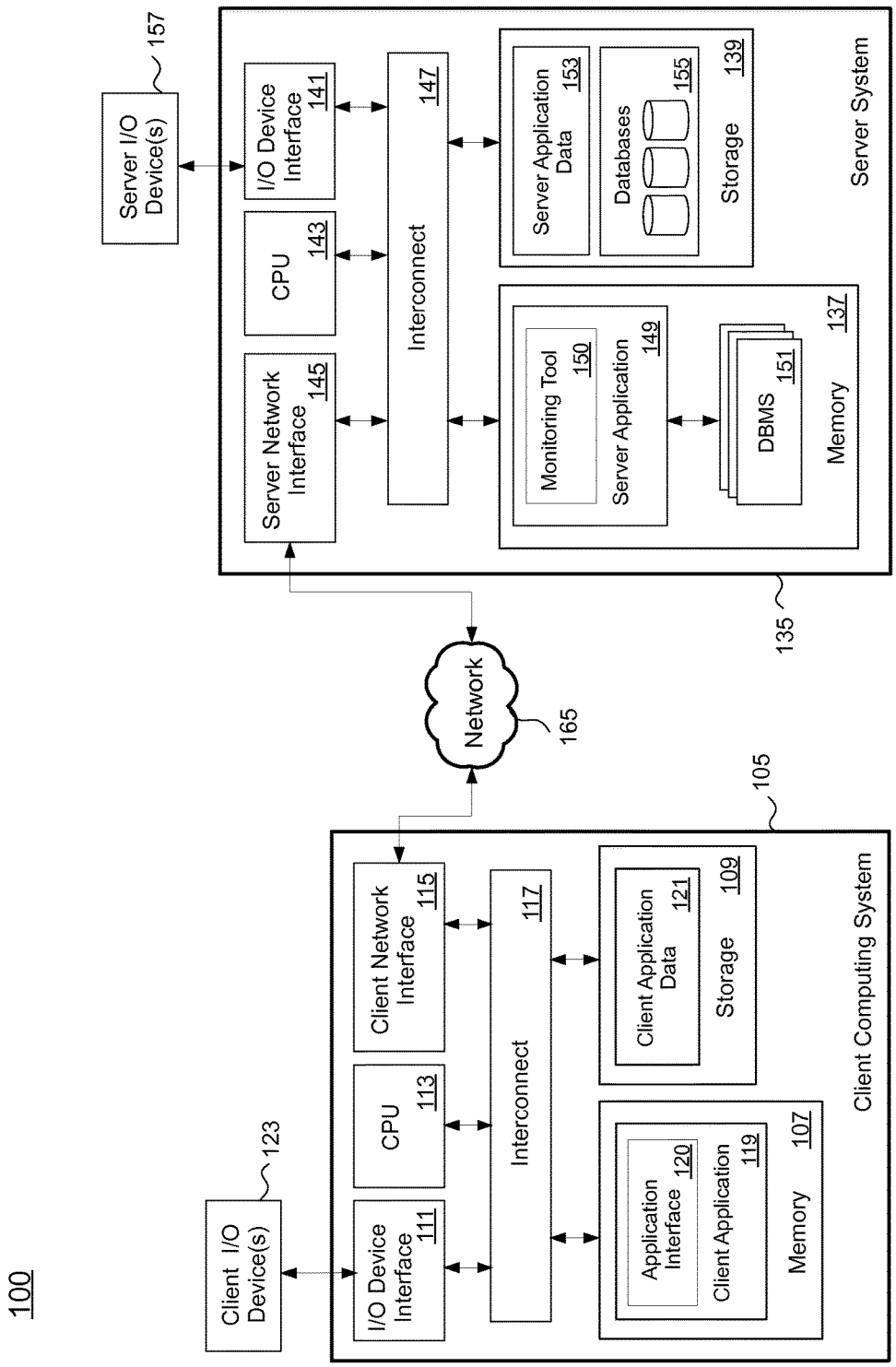
FIG. 1 illustrates a computing infrastructure, according to an embodiment.

The various embodiments described herein are directed to techniques for addressing propagation of inaccurate information in a social networking environment or other online environment. More specifically, inaccurate information of a factual nature may be identified, and countering content may be created and disseminated in order to address the propagation of such inaccurate information.

The various embodiments described herein may have advantages over conventional techniques of addressing inaccurate information. Specifically, the various embodiments may provide the ability to counter factually inaccurate information in a social networking environment without attacking or censoring the purveyor of such inaccurate information. Thus, the various embodiments may address inaccurate information while avoiding the "Streisand effect". Furthermore, by providing countering content, the various embodiments may neutralize the impact of inaccurate information within a social networking environment. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for addressing propagation of inaccurate information in a social networking environment or other online environment. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. Computing infrastructure 100 may constitute a portion of a social networking environment or another online environment involving person-to-person communication. As shown, computing infrastructure 100 includes a client computing system 105 and a server system 135, each of which may be connected to a communications network 165.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. In a further embodiment, client computing system 105 may be a mobile device (e.g., a cellular telephone or a tablet device). Memory 107 may include a client application 119. Client application 119 may interface with server system 135 and other computing systems via application interface 120. Application interface 120 may be a browser or other online interface. Storage 109 may include client application data 121 associated with client application 119. I/O device interface 111 may be communicatively coupled to one or more client I/O devices 123. CPU 113 is included to be representative of a single CPU, multiple CPUs, a single CPU having multiple processing cores, and the like. Client network interface 115 may receive data from and transmit data to server system 135 or another computing system via network 165.

Server system 135 may include a memory 137, storage 139, I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149. The server application 149 may be a social networking application for processing requests from users (e.g., a user of client computing system 105) in a social networking environment. Furthermore, server application 149 may include monitoring tool 150. Monitoring tool 150 may identify inaccurate information and may facilitate creation of content to counter such inaccurate information according to the various embodiments further described herein. As illustrated in FIG. 1, server application 149 interfaces with a database management system (DBMS) 151, which also is included in memory 137. DBMS 151 is included be representative of a single database system or multiple database systems. Storage 139 may include server application data 153 and databases 155. Server application 149 may generate and process server application data 153 based upon interaction with client computing system 105. Server application 149 may send database requests to DBMS 151, and server application 149 may process results returned by DBMS 151 to generate server application data 153. DBMS 151 may include a software application configured to manage databases 155. Databases 155 may include one or more relational databases. Additionally, databases 155 may include one or more ontology trees or other ontological structures. In the context of the various embodiments described herein, server application 149 may facilitate identification of inaccurate information by comparing such information with material from databases 155 (and/or from other data sources). While FIG. 1 illustrates three databases 155, computing infrastructure 100 may include any number of databases. According to an embodiment, DBMS 151 may send requests to remote databases (not shown) via network 165. Furthermore, server application 149 optionally may interface with at least one of a discussion forum, a social network, a product marketplace, or a weblog.

I/O device interface 141 may be communicatively coupled to one or more server I/O devices 157. CPU 143 is included to be representative of a single CPU, multiple CPUs, a single CPU having multiple processing cores, and the like. Server network interface 145 may receive data from and transmit data to client computing system 105 via network 165. Specifically, server application 149 may accept requests sent by client computing system 105 to server system 135 and may transmit data to client computing system 105 or other computing systems via server network interface 145.

Figure 2:
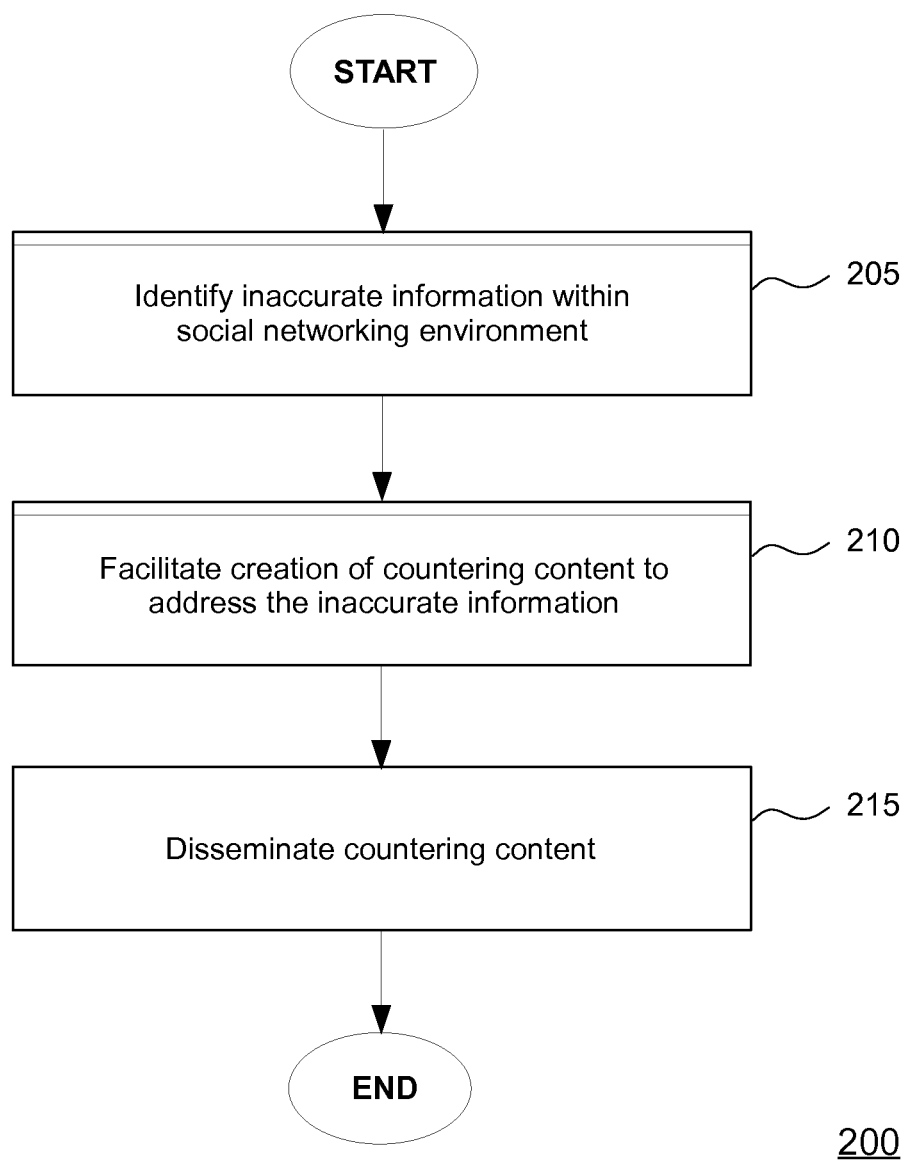
FIG. 2 illustrates a method of addressing propagation of inaccurate information in a social networking environment, according to an embodiment.

FIG. 2 illustrates a method 200 of addressing propagation of inaccurate information in a social networking environment (e.g., including computing infrastructure 100), according to an embodiment. According to the method 200, a monitoring tool associated with an online application (e.g., monitoring tool 150 of server application 149) may identify inaccurate information and may facilitate creation of content to counter the identified inaccurate information. The monitoring tool may be located in a server system in the social networking environment (e.g., server system 135).

The method 200 may begin at step 205, where the monitoring tool may identify inaccurate information within the social networking environment. The monitoring tool may identify inaccurate information via a communications network (e.g., network 165). In some instances, such inaccurate information may be propagated by a highly-rated user (or multiple highly-rated users) among a plurality of users within the social networking environment. For instance, such inaccurate information may be propagated by one or more celebrities or users who are highly trusted by their respective peers. In such case, it may be particularly important to identify and address such inaccurate information, since a highly-rated user may have a relatively high impact on the thoughts and impressions of other users in the social networking environment. An embodiment pertaining to identifying inaccurate information according to step 205 is described further herein in a method 300.

At step 210, the monitoring tool may facilitate creation of countering content to address the inaccurate information. In an embodiment, the countering content may be determined by identifying behavior of one or more users among the plurality of users within the social networking environment. An embodiment pertaining to identifying behavior of one or more users among the plurality of users according to this embodiment of step 210 is described further herein in a method 400. Additionally, the countering content may include at least one aspect that resembles at least one corresponding aspect of the inaccurate information. In an embodiment, the countering content may be determined based upon at least one of language patterns associated with the inaccurate information, content or branding within one or more images associated with the inaccurate information, or stylistic elements associated with the inaccurate information. Such aspects associated with the inaccurate information may be flagged as key points to be countered, and in response the monitoring tool may create countering content that emulates or is analogous to one or more aspects of the inaccurate information such that the countering content is more likely to be considered along with the inaccurate information in the social networking environment.

The monitoring tool may create the countering content directly within the server system. Alternatively, the monitoring tool may request that the countering content be created externally to the server system, e.g., within one or more client computing systems or within another server system in the social networking environment. In the event that the countering content is created externally to the server system, the monitoring tool may obtain the countering content via the communications network upon its creation.

At step 215, the monitoring tool may disseminate the countering content created according to step 210. The monitoring tool may identify the source of the inaccurate information in order to determine portion or portions of the network at which to disseminate the countering content. For instance, upon determining that the inaccurate information originated from a client computing system of a particular user in the social networking environment, the monitoring tool may arrange that users directly or peripherally associated with the particular user (e.g., users having a friendship, group association, or other connection with the particular user) receive the countering content. Additionally, the monitoring tool may arrange that users with an interest in the particular user from whom the inaccurate information originated (e.g., users who are followers of celebrity or special interest content associated with the particular user) receive the countering content. Subsequently, the countering content optionally may be disseminated to additional users. For instance, the countering content may be further disseminated by the users directly or peripherally associated with the particular user from whom the inaccurate information originated.

The monitoring tool may disseminate the countering content according to step 215 via one or more techniques. In an embodiment, the monitoring tool may incorporate the countering content into third party material external to the social networking environment. For instance, if a user in the social networking environment selects a link to a third party website/application, the monitoring tool may facilitate injection of countering content into the third party website/application to address inaccurate information previously presented to such user in the social networking environment and/or presented to such user via the third party website/application.

In a further embodiment, the monitoring tool may disseminate the countering content by incorporating the countering content into at least one post in the social networking environment presented in response to one or more posts including the inaccurate information. In such case, the at least one responding post may emulate the one or more posts including the inaccurate information. The at least one responding post in such case may be created and disseminated directly by the monitoring tool. Additionally or alternatively, the at least one responding post in such case may be created and posted by one or more "allied users" collaborating with the monitoring tool to ensure accuracy of factual information within the social networking environment. Furthermore, the monitoring tool may disseminate the countering content by incorporating the countering content into one or more posts in an activity stream associated with the social networking environment. In such case, the monitoring tool may allocate the one or more posts in the activity stream including the countering content a higher priority than any post associated with the inaccurate information. The one or most posts including the countering content optionally may be displayed more prominently in the activity stream (e.g., with bold text or enlarged text) to reflect higher priority relative to the inaccurate information and/or relative to other posts.

Figure 3:
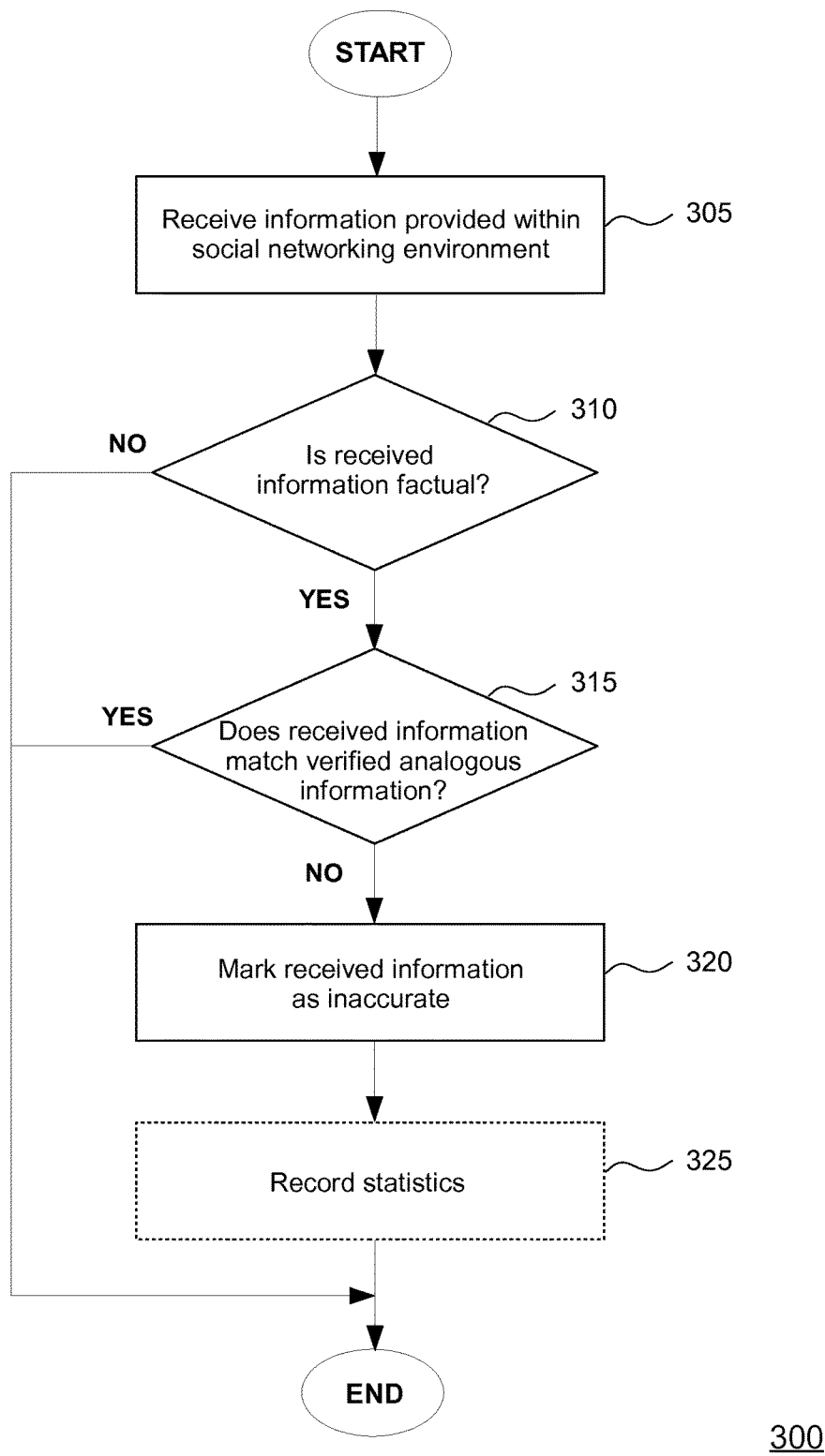
FIG. 3 illustrates a method of identifying inaccurate information within a social networking environment, according to an embodiment.

FIG. 3 illustrates method 300 of identifying inaccurate information within the social networking environment. The method 300 provides an example embodiment with respect to step 205 of the method 200. The method 300 may begin at step 305, where the monitoring tool may receive information provided within the social networking environment. For instance, the information may be posted by a user of a client computing system (e.g., client computing system 105) via an application interface of a client application (e.g., application interface 120 of client application 119). At step 310, the monitoring tool may determine whether the information received at step 305 is factual, i.e., objectively verifiable as true or false. Upon determining that the information is not factual (e.g., an opinion or an unverifiable assertion), then the method 300 may end, since non-factual information cannot be determined to be accurate or inaccurate.

Upon determining at step 310 that the information is factual, at step 315 the monitoring tool may determine whether the received information matches analogous information verified as accurate. Specifically, at step 315 the monitoring tool may compare the received information to the analogous information verified as accurate. The monitoring tool may access such analogous information from a data store. Such data store may include databases in the server system (e.g., databases 155). Additionally or alternatively, such data store may include databases external to the server system. In an embodiment, the monitoring tool may introduce a margin of error in making the match determination, e.g., for a comparison involving quantitative information.

In an embodiment, the monitoring tool may complete the comparison at step 315 between the received information and the information verified as accurate via at least one of natural language processing (NLP), data mining (e.g., text mining), or natural language classification. Additionally or alternatively, the monitoring tool may complete the comparison via one or more other alphanumeric language processing techniques. The monitoring tool may directly complete the comparison via such techniques or alternatively may obtain results of the comparison from an external source.

Upon determining at step 315 that the received information matches the analogous information verified as accurate, the method 300 may end. Upon determining that the received information does not match the analogous information verified as accurate, at step 320 the monitoring tool may mark the received information as inaccurate information. Optionally, upon determining that the received information does not match the analogous information verified as accurate, at step 325 the monitoring tool further may record statistics with respect to the inaccurate information. For instance, such statistics may indicate the point in time at which the inaccurate information was made publicly available via the social networking environment. Moreover, such statistics may indicate the respective identities of users in the social networking environment who have been exposed to the inaccurate information via a post or some other connection with the source of the inaccurate information. Such statistics may provide quantitative information with respect to the speed at which the inaccurate information has spread through the social networking environment or the extent to which the inaccurate information has spread.

Figure 4:
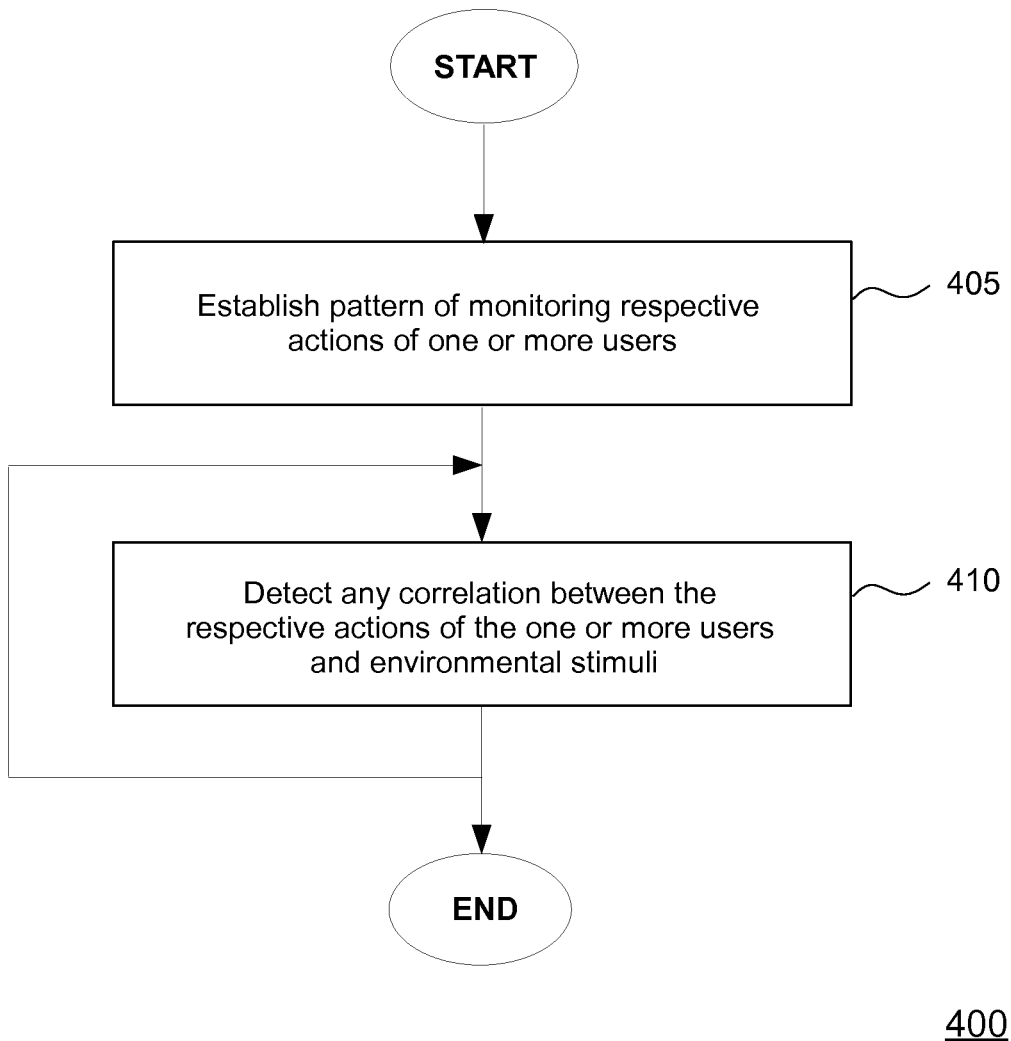
FIG. 4 illustrates a method of identifying behavior of one or more users among a plurality of users within a social networking environment, according to an embodiment.

FIG. 4 illustrates method 400 of identifying behavior of one or more users among the plurality of users within the social networking environment. The method 400 provides an example embodiment with respect to step 210 of the method 200. The method 400 may begin at step 405, where the monitoring tool may establish a pattern of monitoring respective actions of one or more users among the plurality of users. At step 410, in response to monitoring the respective actions of the one or more users according to step 405, the monitoring tool may detect any correlation between the respective actions of the one or more users and environmental stimuli. Step 410 may be repeated to detect multiple correlations. For example, it is assumed that User A often re-posts content posted by a User B within a day of User B posting content in the social networking environment. According to the method 400, the monitoring tool may detect that User A has a propensity to re-post content posted by User B, which serves as an environmental stimulus. As a further example, it is assumed that User C routinely logs into the social networking environment within a certain time period during each weekday in order to check for content posted by other users within a particular online community. According to the method 400, the monitoring tool may detect that User C has a propensity to check for content posted by other users within a certain time period during each weekday, which serves as an environmental stimulus. In the context of these examples, by identifying behavior of User A and User C within the social networking environment, the monitoring tool may determine how best to facilitate creation of and disseminate countering content to address inaccurate information that may reach these users. More specifically, the monitoring tool may ensure that countering content is presented to User A (e.g., via an activity stream) in order to address any inaccurate information posted by User B. Furthermore, the monitoring tool may ensure that countering content is presented to User C within the time period during which User C routinely logs into the social networking environment in order to address any inaccurate information posted by other users. In an embodiment, identification of behavior according to the method 400 may occur during a predetermined time period. According to such embodiment, detection of any correlation per step 410 may continue until the predetermined time period expires.

By disseminating countering content according to the various embodiments described herein, factually inaccurate information may be identified and addressed with a reduced risk of offending or otherwise negatively affecting users in a social networking environment.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method of addressing propagation of inaccurate information in a social networking environment, the method comprising:
   identifying, via a communications network, inaccurate information within the social networking environment;
   facilitating creation of countering content to address the inaccurate information, wherein the countering content is determined by identifying behavior of one or more users among a plurality of users within the social networking environment, wherein identifying the behavior of the one or more users comprises establishing a pattern of monitoring respective actions of the one or more users and detecting at least one correlation between the respective actions of the one or more users and environmental stimuli, and wherein the at least one correlation includes a first user performing an action based upon an action of a second user; and disseminating the countering content by incorporating the countering content into at least one post within the social networking environment presented in response to one or more posts including the inaccurate information.

2. The method of claim 1, wherein identifying the inaccurate information within the social networking environment comprises:

receiving information provided within the social networking environment;

upon determining that the received information is factual, determining whether the received information matches analogous information verified as accurate; and upon determining that the received information does not match the analogous information verified as accurate, marking the received information as inaccurate.

3. The method of claim 2, wherein determining whether the received information matches the analogous information verified as accurate comprises completing a comparison via data mining.

4. The method of claim 2, wherein identifying the inaccurate information within the social networking environment further comprises, upon determining that the received information does not match the analogous information verified as accurate, recording statistics with respect to the inaccurate information.

5. The method of claim 1, wherein the countering content includes at least one aspect that resembles at least one corresponding aspect of the inaccurate information.

6. The method of claim 1, wherein the countering content is further determined based upon branding within one or more images associated with the inaccurate information.

7. The method of claim 1, wherein disseminating the countering content further comprises incorporating the countering content into third party material external to the social networking environment.

8. The method of claim 1, wherein disseminating the countering content further comprises incorporating the countering content into one or more posts in an activity stream associated with the social networking environment, and wherein the one or more posts in the activity stream incorporating the countering content have a higher priority than any post associated with the inaccurate information.

9. A computer program product for addressing propagation of inaccurate information in a social networking environment, the computer program product comprising a computer readable storage medium having program instructions embodied therewith, the program instructions executable by a computing device to cause the computing device to:

identify, via a communications network, inaccurate information within the social networking environment;

facilitate creation of countering content to address the inaccurate information, wherein the countering content is determined by identifying behavior of one or more users among a plurality of users within the social networking environment, wherein identifying the behavior of the one or more users comprises establishing a pattern of monitoring respective actions of the one or more users and detecting at least one correlation between the respective actions of the one or more users and environmental stimuli, and wherein the at least one correlation includes a first user performing an action based upon an action of a second user; and disseminate the countering content by incorporating the countering content into at least one post within the social networking environment presented in response to one or more posts including the inaccurate information.

10. The computer program product of claim 9, wherein identifying the inaccurate information within the social networking environment comprises:

receiving information provided within the social networking environment;

upon determining that the received information is factual, determining whether the received information matches analogous information verified as accurate; and upon determining that the received information does not match the analogous information verified as accurate, marking the received information as inaccurate.

11. The computer program product of claim 10, wherein determining whether the received information matches the analogous information verified as accurate comprises completing a comparison via data mining.

12. The computer program product of claim 10, wherein identifying the inaccurate information within the social networking environment further comprises, upon determining that the received information does not match the analogous information verified as accurate, recording statistics with respect to the inaccurate information.

13. The computer program product of claim 9, wherein the countering content includes at least one aspect that resembles at least one corresponding aspect of the inaccurate information.

14. A system comprising:

a processor; and a memory storing an application program, which, when executed on the processor, performs an operation of addressing propagation of inaccurate information in a social networking environment, the operation comprising:

identifying, via a communications network, inaccurate information within the social networking environment;

facilitating creation of countering content to address the inaccurate information, wherein the countering content is determined by identifying behavior of one or more users among a plurality of users within the social networking environment, wherein identifying the behavior of the one or more users comprises establishing a pattern of monitoring respective actions of the one or more users and detecting at least one correlation between the respective actions of the one or more users and environmental stimuli, and wherein the at least one correlation includes a first user performing an action based upon an action of a second user; and disseminating the countering content by incorporating the countering content into at least one post within the social networking environment presented in response to one or more posts including the inaccurate information.

15. The system of claim 14, wherein identifying the inaccurate information within the social networking environment comprises:

receiving information provided within the social networking environment;

upon determining that the received information is factual, determining whether the received information matches analogous information verified as accurate; and upon determining that the received information does not match the analogous information verified as accurate, marking the received information as inaccurate.

16. The system of claim 15, wherein determining whether the received information matches the analogous information verified as accurate comprises completing a comparison via data mining.

17. The system of claim 15, wherein identifying the inaccurate information within the social networking environment further comprises, upon determining that the received information does not match the analogous information verified as accurate, recording statistics with respect to the inaccurate information.

18. The computer program product of claim 9, wherein the countering content is further determined based upon branding within one or more images associated with the inaccurate information.

19. The system of claim 14, wherein the countering content is further determined based upon branding within one or more images associated with the inaccurate information.

20. The method of claim 1, wherein the countering content is further determined based upon language patterns associated with the inaccurate information.

\* \* \* \* \*